United States Patent
Hikazudani et al.

(10) Patent No.: US 10,449,493 B2
(45) Date of Patent: Oct. 22, 2019

(54) PROCESSING APPARATUS EQUIPPED WITH CATALYST-SUPPORTING HONEYCOMB STRUCTURE, AND METHOD FOR MANUFACTURING SAME

(71) Applicant: Hitachi Zosen Corporation, Osaka-shi (JP)

(72) Inventors: Susumu Hikazudani, Osaka (JP); Naoe Hino, Osaka (JP); Seigo Yamamoto, Osaka (JP); Kana Shimizu, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 16/037,398

(22) Filed: Jul. 17, 2018

(65) Prior Publication Data

US 2018/0318762 A1    Nov. 8, 2018

Related U.S. Application Data

(62) Division of application No. 14/380,585, filed as application No. PCT/JP2012/081367 on Dec. 4, 2012, now Pat. No. 10,052,586.

(30) Foreign Application Priority Data

Feb. 22, 2012  (JP) ................. 2012-036155

(51) Int. Cl.
| | | |
|---|---|---|
| *F01N 3/28* | (2006.01) | |
| *B01D 53/88* | (2006.01) | |
| *B01J 35/04* | (2006.01) | |
| *B29D 99/00* | (2010.01) | |
| *C01B 3/04* | (2006.01) | |
| *B01D 53/86* | (2006.01) | |
| *B29L 31/14* | (2006.01) | |

(52) U.S. Cl.
CPC ............ *B01D 53/885* (2013.01); *B01J 35/04* (2013.01); *B29D 99/0089* (2013.01);
(Continued)

(58) Field of Classification Search
None
See application file for complete search history.

(56) References Cited

U.S. PATENT DOCUMENTS

| | | |
|---|---|---|
| 6,025,298 A | 2/2000 | Imoto et al. |
| 6,524,680 B1 | 2/2003 | Tanaka et al. |

(Continued)

FOREIGN PATENT DOCUMENTS

| | | |
|---|---|---|
| DE | 69917090 T2 | 9/2004 |
| EP | 1063003 A2 | 12/2000 |

(Continued)

OTHER PUBLICATIONS

International Search Report dated Feb. 12, 2013, issued for PCT/JP2012/081367.

(Continued)

*Primary Examiner* — Jelitza M Perez
(74) *Attorney, Agent, or Firm* — Locke Lord LLP; James E. Armstrong, IV; Nicholas J. DiCeglie, Jr.

(57) ABSTRACT

A processing apparatus equipped with a catalyst-supporting honeycomb structure, which is characterized in that corrugated plate-like glass fiber papers having a functional catalyst supported thereon and flat plate-like glass fiber papers having the same functional catalyst supported thereon are alternately laminated without being bonded to each other, to form a catalyst-supporting honeycomb structure, and this catalyst-supporting honeycomb structure is packed in a casing.

20 Claims, 2 Drawing Sheets

(52) U.S. Cl.
CPC .......... *C01B 3/047* (2013.01); *F01N 3/2835* (2013.01); *B01D 53/8631* (2013.01); *B01D 53/8634* (2013.01); *B01D 2255/1026* (2013.01); *B01D 2255/20707* (2013.01); *B01D 2255/20723* (2013.01); *B01D 2255/20776* (2013.01); *B01D 2257/2064* (2013.01); *B01D 2257/30* (2013.01); *B01D 2257/404* (2013.01); *B01D 2257/406* (2013.01); *B29L 2031/14* (2013.01); *F01N 2330/30* (2013.01); *Y02E 60/364* (2013.01); *Y10T 156/1003* (2015.01)

(56) References Cited

U.S. PATENT DOCUMENTS

| | | |
|---|---|---|
| 2005/0022671 A1 | 2/2005 | Yamazaki et al. |
| 2006/0182669 A1 | 8/2006 | Matumura et al. |
| 2007/0122330 A1 | 5/2007 | Noh |

FOREIGN PATENT DOCUMENTS

| | | |
|---|---|---|
| EP | 1099834 A2 | 5/2001 |
| JP | 11-216370 A | 8/1999 |
| JP | 2000-140554 A | 5/2000 |
| JP | 2000-271477 A | 10/2000 |
| JP | 2002-119868 A | 4/2002 |
| JP | 2003-172134 A | 6/2003 |
| JP | 2006-231324 A | 9/2006 |
| JP | 2010-013773 A | 1/2010 |

OTHER PUBLICATIONS

Supplementary European Search Report dated Oct. 1, 2015, issued for the corresponding EP patent application No. 12 86 9477.5.
Official Letter dated Oct. 26, 2015, issued the corresponding Chinese patent application No. 201280070315.2.
Kondou et al., JP 2003-172134A—translated document.
Watanabe et al., JP 2000-140554A—translated document.

PROCESSING APPARATUS EQUIPPED WITH CATALYST-SUPPORTING HONEYCOMB STRUCTURE, AND METHOD FOR MANUFACTURING SAME

CROSS REFERENCE TO RELATED APPLICATIONS

This Application is a Divisional of U.S. patent application Ser. No. 14/380,585 filed on Aug. 22, 2014, which application is a U.S. 371 National Phase of International PCT Patent Application No. PCT/JP2012/081367, filed on Dec. 4, 2018, which application claims priority to Japanese Patent Application No. 2012-036155, filed on Feb. 22, 2012. The entire contents of these applications are incorporated herein by reference in their entirety.

TECHNICAL FIELD

The present invention relates to a processing apparatus equipped with a catalyst-supporting honeycomb structure which is used for, for example, an exhaust gas cleaning process or manufacture of hydrogen by ammonia decomposition, or the like, and a method for manufacturing the same.

BACKGROUND ART

Conventionally, as a base material of a honeycomb structure (flat plate+corrugated plate) of a processing apparatus equipped with a catalyst-supporting honeycomb structure which is used for an exhaust gas cleaning process or the like, it was difficult to use commercially available glass fiber papers, and glass fiber papers which are applicable to corrugate processing were restricted with respect to the kinds thereof (see Patent Literature 1 as described below).

Then, conventionally, in order to fabricate the processing apparatus equipped with a catalyst-supporting honeycomb structure, a tangent portion of the honeycomb structure, namely a portion in which apexes of the corrugated plate come into contact with the flat plate, was bonded via an adhesive, and for the purpose of keeping the honeycomb structure, other means were not taken.

In addition, in the manufacture of an exhaust gas cleaning processing apparatus including a conventional honeycomb structure as a base material, in order to support a functional catalyst on the honeycomb structure, a method of dipping the honeycomb structure itself in a catalyst-containing solution or slurry was adopted.

Furthermore, in this honeycomb structure formed by alternately laminating flat plates and corrugated plates and bonding, for example, in the case where a solid content is contained in a gas to be processed in an exhaust gas cleaning process or the like, there is seen a phenomenon in which the solid content clogs in cells (voids) of the honeycomb structure with a lapse of operating time. Since the gas to be processed does not come into contact with inner walls of the cells clogged with the solid content, a contact area of the gas to be processed is lowered. In addition, a pressure loss increases. In consequence, in the case of clogging is generated to a certain extent or more by an exhaust gas cleaning process or the like, it was necessary to exchange the honeycomb structure or conduct a regeneration process for resolution of clogging.

Conventionally, as for such a regeneration process for resolution of clogging of the honeycomb structure, there was adopted a method of pressing the clogged portion by a stick or the like.

PRIOR ART LITERATURE

Patent Literature

PTL 1: JP-A-2010-013773

SUMMARY OF INVENTION

Technical Problem

However, according to the conventional method described in the above-described Patent Literature 1, in order to support the catalyst on the honeycomb structure, the honeycomb structure itself is dipped in a catalyst-containing solution or slurry and then dried. For this reason, large-scale equipment was required as a dipping tank of the honeycomb structure or a drying device, and in its turn, there was involved such a problem that the manufacturing cost of the honeycomb structure is high.

In addition, according to the conventional method, for example, as for the regeneration process for resolution of clogging of cells of the honeycomb structure with a solid content in the gas to be processed in an exhaust gas cleaning process or the like, a method of pressing the clogged portion by a stick or the like is adopted. Therefore, in a honeycomb structure with poor mechanical strength, there was involved such a problem that the cell portions are damaged by such a regeneration process.

An object of the present invention is to solve the above-described problems of the conventional art and to provide a processing apparatus equipped with a catalyst-supporting honeycomb structure, as well as a method for manufacturing the same, in which the catalyst-supporting honeycomb structure can be formed by using a commercially available, inexpensive glass fiber paper as a base material; the manufacturing cost is low without requiring large-scale equipment such as a dipping tank, a drying device, etc. as conventionally used for a catalyst-supporting honeycomb structure; for example, in an exhaust gas cleaning process or the like, even if a solid content in a gas to be processed clogs in cells of the catalyst-supporting honeycomb structure with a lapse of operating time, this can be easily regenerated; and a lowering of a contact area of the gas to be processed or an increase of a pressure loss can be prevented from occurring.

Solution to Problem

In order to solve the above-described problem, an invention as set forth in claim 1 is concerned with a processing apparatus equipped with a catalyst-supporting honeycomb structure, which is characterized in that corrugated plate-like glass fiber papers having a functional catalyst supported thereon and flat plate-like glass fiber papers having the same functional catalyst supported thereon are alternately laminated without being bonded to each other, to form a catalyst-supporting honeycomb structure, and this catalyst-supporting honeycomb structure is packed in a casing.

An invention as set forth in claim 2 is concerned with the processing apparatus equipped with a catalyst-supporting honeycomb structure according to claim 1, which is characterized in that the casing has a square cylindrical shape, and the casing is composed of a casing main body having a lateral cross section of a substantially U-shape and a flat plate-like lid body that covers an opening of this, or composed of a casing main body having a lateral cross section of a substantially L-shape and a lid body to be fitted into this and having a lateral cross section of a substantially inverted L-shape.

An invention as set forth in claim 3 is concerned with the processing apparatus equipped with a catalyst-supporting honeycomb structure according to claim 1 or 2, which is characterized in that an inorganic fiber blanket is laid on an inner surface of the casing.

An invention as set forth in claim 4 is concerned with the processing apparatus equipped with a catalyst-supporting honeycomb structure according to anyone of claims 1 to 3, which is characterized in that the functional catalyst is a catalyst selected from the group consisting of a denitration catalyst, a desulfurization catalyst, a dioxin decomposition catalyst, and an ammonia decomposition catalyst, and is used for an exhaust gas cleaning process or manufacture of hydrogen by ammonia decomposition.

An invention as set forth in claim 5 is concerned with a method for manufacturing a processing apparatus equipped with a catalyst-supporting honeycomb structure, which is characterized by consisting of a step of baking a glass fiber paper to remove an organic binder component contained in the glass fiber paper by burning; a step of applying a functional catalyst-containing slurry on the glass fiber paper after removal of the organic binder component; a step of shaping the functional catalyst-containing slurry-applied glass fiber paper by a crimping die and a pressing jig; a step of drying the shaped, corrugated plate-like functional catalyst-containing slurry-applied glass fiber paper and peeling off it from the die; meanwhile, a step of drying the flat plate-like functional catalyst slurry-applied glass fiber paper having not been shaped in a corrugated plate-like form; a step of calcinating the corrugated plate-like functional catalyst-containing slurry-applied glass fiber paper and the flat plate-like functional catalyst slurry-applied glass fiber paper to form a functional catalyst-supporting, flat plate-like glass fiber paper and a functional catalyst-supporting, corrugated plate-like glass fiber paper; and a step of alternately laminating the functional catalyst-supporting, flat plate-like glass fiber paper after calcination and the functional catalyst-supporting, corrugated plate-like glass fiber paper after calcination without being bonded to each other, to forma catalyst-supporting honeycomb structure and packing this catalyst-supporting honeycomb structure in a casing.

An invention as set forth in claim 6 is concerned with the method for manufacturing a processing apparatus equipped with a catalyst-supporting honeycomb structure according to claim 5, which is characterized in that the removal step of an organic binder component of the glass fiber paper is carried out under a baking condition at from 350 to 450° C. for from 30 minutes to one hour and thirty minutes.

An invention as set forth in claim 7 is concerned with the method for manufacturing a processing apparatus equipped with a catalyst-supporting honeycomb structure according to claim 5 or 6, which is characterized in that in the applying step of a functional catalyst-containing slurry, a functional catalyst-containing slurry in which a silica sol is contained is used.

An invention as set forth in claim 8 is concerned with the method for manufacturing a processing apparatus equipped with a catalyst-supporting honeycomb structure according to any one of claims 5 to 7, which is characterized in that in the shaping step of the functional catalyst slurry-applied glass fiber paper in a corrugated plate-like form, a die composed of a metal panel having parallel recessed grooves having a width of from 5 to 15 mm, a height of from 2 to 10 mm, and a radius of curvature in a groove bottom of from 0.5 to 2 mm is used, and the functional catalyst slurry-applied glass fiber paper placed on the die is pressed down along the recessed grooves of the die by the pressing jig, thereby achieving shaping.

An invention as set forth in claim 9 is concerned with the method for manufacturing a processing apparatus equipped with a catalyst-supporting honeycomb structure according to any one of claims 5 to 8, which is characterized in that the drying steps of the shaped, corrugated plate-like functional catalyst-containing slurry-applied glass fiber paper and the flat plate-like functional catalyst slurry-applied glass fiber paper having not been shaped in a corrugated plate-like form are carried out under a condition at from 250 to 400° C. for from 30 minutes to one hour and thirty minutes, respectively.

An invention as set forth in claim 10 is concerned with the method for manufacturing a processing apparatus equipped with a catalyst-supporting honeycomb structure according to any one of claims 5 to 9, which is characterized in that the calcination step of the corrugated plate-like functional catalyst-containing slurry-applied glass fiber paper and the flat plate-like functional catalyst slurry-applied glass fiber paper as formed in a honeycomb structure is carried out under a condition at from 400 to 550° C. for 2 to 4 hours.

An invention set forth in claim. 11 is concerned with the method for manufacturing a processing apparatus equipped with a catalyst-supporting honeycomb structure according to anyone of claims 5 to 10, which is characterized in that in the packing step of the catalyst-supporting honeycomb structure, the inorganic fiber blanket is laid on an inner surface of the casing before packing of the catalyst-supporting honeycomb structure.

Advantageous Effects of Invention

According to the invention as set forth in claim 1, there are brought such effects that the catalyst-supporting honeycomb structure can be formed by using a commercially available, inexpensive glass fiber paper as a base material; the manufacturing cost is low without requiring large-scale equipment such as a dipping tank, a drying device, etc. as conventionally used for a honeycomb structure; for example, in an exhaust gas cleaning process or the like, even if a solid content in a gas to be processed clogs in cells of the catalyst-supporting honeycomb structure with a lapse of operating time, this can be easily regenerated; and a lowering of a contact area of the gas to be processed or an increase of a pressure loss can be prevented from occurring.

According to the invention as set forth in claim 2, there are brought such effects that the inexpensive catalyst-supporting honeycomb structure using a glass fiber paper as a base material can be stably kept; and the casing can be opened for the purpose of resolution of clogging of cells of the catalyst-supporting honeycomb structure to be caused due to a solid content in a gas to be processed in an exhaust gas cleaning process or the like.

According to the invention as set forth in claim 3, there is brought such an effect that a vibration countermeasure can be taken by a frictional force by the catalyst-supporting honeycomb structure and the inorganic fiber blanket.

According to the invention as set forth in claim 4, there is brought such an effect that the inexpensive catalyst-supporting honeycomb structure using a glass fiber paper as a base material can be utilized for an exhaust gas cleaning process and manufacture of hydrogen by ammonia decomposition.

According to the invention as set forth in claim 5, there are brought such effects that the catalyst-supporting honeycomb structure can be formed by using a commercially available, inexpensive glass fiber paper as a base material; the manufacturing cost is low without requiring large-scale equipment such as a dipping tank, a drying device, etc. as conventionally used for a honeycomb structure; for example, in an exhaust gas cleaning process or the like, even if a solid content in a gas to be processed clogs in cells of the catalyst-supporting honeycomb structure with a lapse of operating time, this can be easily regenerated; and a lowering of a contact area of the gas to be processed or an increase of a pressure loss can be prevented from occurring.

According to the invention as set forth in claim 6, there are brought such effects that by baking the glass fiber paper, it is possible to remove the organic binder with ease; since the glass fiber paper after removal of the organic binder loses a force of repulsion, it is possible to conduct molding in a corrugated form, so that the catalyst-supporting honeycomb structure can be formed by using a glass fiber paper as a base material; and moreover, the manufacturing cost is low without requiring large-scale equipment.

According to the invention as set forth in claim 7, there is brought such an effect that by applying the silica sol-containing functional catalyst on the glass fiber paper which has lost a force of repulsion by removal of the organic binder in the baking step, the silica sol exhibits a function as an inorganic binder, thereby keeping the shape of a functional catalyst-supporting glass fiber paper.

According to the invention as set forth in claim 8, there is brought such an effect that it is possible to conduct molding in a corrugated plate-like form without causing breakage of the functional catalyst-supporting glass fiber paper.

According to the invention as set forth in claim 9, there is brought such an effect that the corrugated plate-like and flat plate-like functional catalyst slurry-applied glass fiber papers can be peeled off from the die with ease upon drying.

According to the invention as set forth in claim 10, there is brought such an effect that uniform calcination can be conducted without causing a decrease of activity of the functional catalyst.

According to the invention as set forth in claim 11, there is brought such an effect that a vibration countermeasure can be taken by a frictional force by the catalyst-supporting honeycomb structure and the inorganic fiber blanket.

EXPLANATIONS OF REFERENCE NUMERALS

1: Catalyst-supporting honeycomb structure
2: Functional catalyst-supporting, corrugated plate-like glass fiber paper
3: Functional catalyst-supporting, flat plate-like glass fiber paper
4: Casing
4*a*: Casing main body
4*b*: Lid body
5: Blanket
10: Processing apparatus equipped with a catalyst-supporting honeycomb structure Description of Embodiments Next, embodiments of the present invention are described by reference to the accompanying drawings, but it should not be construed that the present invention is limited thereto.

Figure 1:
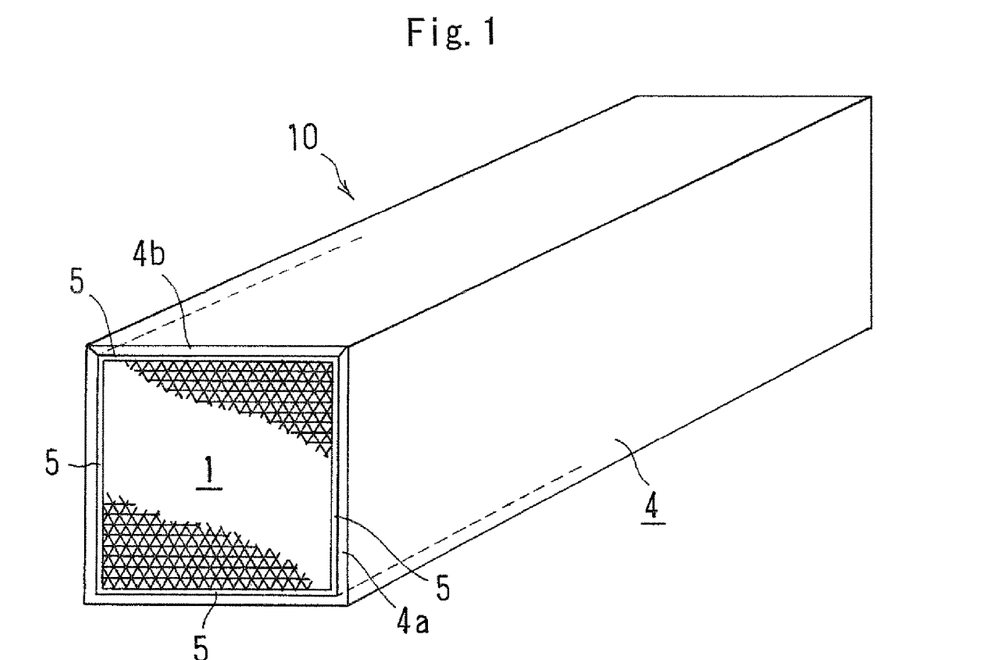
FIG. 1 is a perspective view showing an embodiment of a processing apparatus equipped with a catalyst-supporting honeycomb structure according to the present invention.
Figure 2:
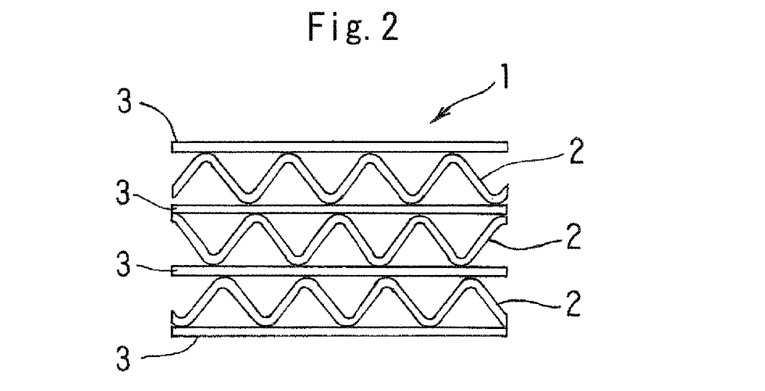
FIG. 2 is a principal part, enlarged front view of a catalyst-supporting honeycomb structure portion of the processing apparatus of FIG. 1.

FIG. 1 is a perspective view showing an embodiment of a processing apparatus equipped with a catalyst-supporting honeycomb structure according to the present invention. FIG. 2 is a principal part, enlarged front view of a catalyst-supporting honeycomb structure portion of the processing apparatus of FIG. 1.

Referring to FIGS. 1 and 2, a processing apparatus (10) equipped with a catalyst-supporting honeycomb structure according to the present invention is characterized in that a corrugated plate-like glass fiber paper (2) having a functional catalyst supported thereon and a flat plate-like glass fiber paper (3) having the same functional catalyst supported thereon are alternately laminated without being bonded to each other, to form a catalyst-supporting honeycomb structure (1), and this catalyst-supporting honeycomb structure (1) is packed in a casing (4).

The present inventors noted that a reason why a commercially available glass fiber paper cannot be molded in a corrugated plate-like form by using a corrugation molding machine (corrugator) resides in the matter that a force of repulsion due to an organic binder contained in the glass fiber paper is so large that even if the glass fiber paper is bent by applying a force, it is returned into an original state, whereas if a force is excessively applied, the glass fiber paper breaks, and therefore, a large force cannot be applied. However, it has been found that it is possible to remove an organic binder contained in a glass fiber paper with ease by baking the glass fiber paper, and since the glass fiber paper after removal of the organic binder loses a force of repulsion, it is possible to mold the glass fiber paper in a corrugated form. Furthermore, when a functional catalyst-containing slurry is applied on the glass fiber paper after baking, an inorganic binder contained in the slurry, for example, a silica sol, etc., carries out a function as a binder of the glass fiber paper, and by applying a functional catalyst-containing slurry on the glass fiber paper after baking, it is possible to keep the corrugated form. In this way, it has been found that the catalyst-supporting honeycomb structure (1) that is a laminate of the functional catalyst-supporting, flat plate-like glass fiber paper (3) and the functional catalyst-supporting, corrugated plate-like glass fiber paper (2) can be manufactured without bonding flat plates and corrugated plates each using a glass fiber paper to each other with an adhesive as in the conventional art.

In accordance with the processing apparatus (10) equipped with a catalyst-supporting honeycomb structure according to the present invention, the catalyst-supporting honeycomb structure (1) can be formed by using a commercially available, inexpensive glass fiber paper as a base material. Moreover, since it is merely required that a functional catalyst-containing slurry is applied on the glass fiber paper after removal of the organic binder component and then dried, the manufacturing cost is low without requiring large-scale equipment such as a dipping tank, a drying device, etc. as conventionally used for a so-called adhesive type honeycomb structure.

In addition, for example, in an exhaust gas cleaning process or the like, even if a solid content in a gas to be processed clogs in cells of the catalyst-supporting honeycomb structure (1) with a lapse of operating time, since the functional catalyst-supporting, corrugated plate-like glass fiber paper (2) and the functional catalyst-supporting, flat plate-like glass fiber paper (3) are alternately laminated without being bonded to each other, to form the catalyst-supporting honeycomb structure (1), and this catalyst-supporting honeycomb structure (1) is packed in the casing (4), these can be discharged separately from the casing (4), the functional catalyst-supporting, corrugated plate-like glass fiber paper (2) and the functional catalyst-supporting, flat plate-like glass fiber paper (3) as discharged can be easily regenerated by means of cleaning or the like. Therefore, a lowering of a contact area with the gas to be processed or an increase of a pressure loss can be surely prevented from occurring.

In the processing apparatus (10) equipped with a catalyst-supporting honeycomb structure according to the present invention, it is preferable that the casing (4) has a square cylindrical shape. It is preferable that the casing (4) is composed of a casing main body (4a) having a lateral cross section of a substantially U-shape and a flat plate-like lid body (4b) that covers an opening of this.

Also, while illustration is omitted, it is preferable that the casing (4) is composed of a casing main body having a lateral cross section of a substantially L-shape and a lid body to be fitted into this and having a lateral cross section of a substantially inverted L-shape.

It is to be noted that the shape of the casing (4) is not limited to a square cylindrical shape, but it may also be a cylindrical shape. However, the square cylindrical shape is more preferable on the occasion of packing the casing (4) with the catalyst-supporting honeycomb structure (1) in which the functional catalyst-supporting, corrugated plate-like glass fiber paper (2) after baking and the functional catalyst-supporting, flat plate-like glass fiber paper (3) after baking are alternately laminated without being bonded to each other.

In the processing apparatus (10) equipped with a catalyst-supporting honeycomb structure according to the present invention, it is preferable that an inorganic fiber blanket (5) is laid on an inner surface of the casing (4). A vibration countermeasure can be taken by a frictional force by the catalyst-supporting honeycomb structure (1) and the inorganic fiber blanket (5) on the inner surface of the casing (4).

Here, examples of an inorganic fiber that is a raw material of the blanket (5) include a ceramic fiber, a glass fiber, a silica sol fiber, an alumina fiber, and a rock wool.

In addition, in the processing apparatus (10) equipped with a catalyst-supporting honeycomb structure according to the present invention, the functional catalyst is preferably a catalyst selected from the group consisting of a denitration catalyst, a desulfurization catalyst, a dioxin decomposition catalyst, and an ammonia decomposition catalyst, and it can be used for an exhaust gas cleaning process or manufacture of hydrogen by ammonia decomposition. It is to be noted that a catalyst containing vanadium is preferably used as the denitration catalyst, and a catalyst containing ruthenium is preferably used as the ammonia decomposition catalyst.

Figure 3:
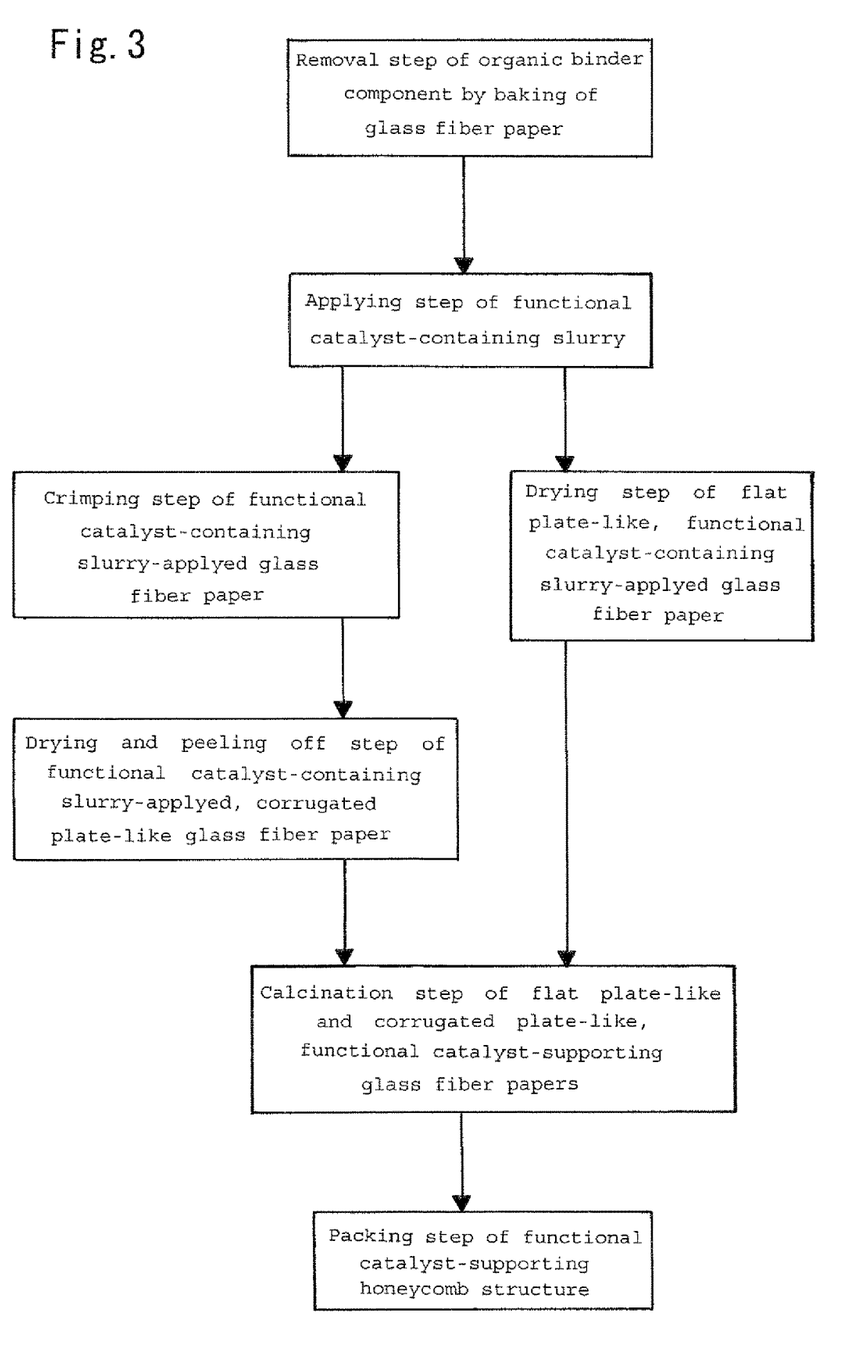
FIG. 3 is a block diagram showing sequent steps of a method for manufacturing a processing apparatus equipped with a catalyst-supporting honeycomb structure according to the present invention.

Next, a method for manufacturing the processing apparatus (10) equipped with a catalyst-supporting honeycomb structure according to the present invention is described. FIG. 3 is a flow sheet showing sequent steps of the manufacture method according to the present invention.

Referring to this drawing, the method for manufacturing the processing apparatus (10) equipped with a catalyst-supporting honeycomb structure according to the present invention consists of a step of baking a commercially available glass fiber paper to remove an organic binder component contained in the glass fiber paper by burning; a step of applying a functional catalyst-containing slurry on the glass fiber paper after removal of the organic binder component; a step of shaping the functional catalyst-containing slurry-applied glass fiber paper by a crimping die and a pressing jig; a step of drying the shaped, corrugated plate-like functional catalyst-containing slurry-applied glass fiber paper and peeling off it from the die; meanwhile, a step of drying the flat plate-like functional catalyst slurry-applied glass fiber paper having not been shaped in a corrugated plate-like form; a step of calcinating the corrugated plate-like functional catalyst-containing slurry-applied glass fiber paper and the flat plate-like functional catalyst slurry-applied glass fiber paper to form the functional catalyst-supporting, flat plate-like glass fiber paper (2) and the functional catalyst-supporting, corrugated plate-like glass fiber paper (3); and a step of laying an inorganic fiber blanket (5) in the casing (4), alternately laminating the functional catalyst-supporting, flat plate-like glass fiber paper (2) after calcination and the functional catalyst-supporting, corrugated plate-like glass fiber paper (3) after calcination without being bonded to each other, to form the catalyst-supporting honeycomb structure (1) and packing this catalyst-supporting honeycomb structure (1) in the casing (4).

That is, a commercially available glass fiber paper containing an organic binder can be used for the glass fiber paper which is used in the present invention. It is to be noted that examples of the organic binder which is used in the commercially available glass fiber paper include an acrylic resin, a polyvinyl alcohol (PVA)/polyvinyl acetate copolymer, an unsaturated polyester-based resin, an epoxy resin, and the like.

Then, in the method for manufacturing the processing apparatus (10) equipped with a catalyst-supporting honeycomb structure according to the present invention, it is preferable that the removal step of an organic binder component of the glass fiber paper is carried out under a baking condition at from 350 to 450° C. for from 30 minutes to one hour and thirty minutes.

Here, when the baking temperature is made too high, or the baking time is made too long, the organic binder contained in the glass fiber paper is excessively removed, so that the shape of the glass fiber paper cannot be kept. On the other hand, when the baking temperature is too low, or the baking time is too short, the organic binder does not blow, namely it cannot be removed, and hence, such is not preferable.

Meanwhile, in order to obtain the flat plate-like functional catalyst-supporting glass fiber paper having not been shaped in a corrugated plate-like form, at first, a commercially available glass fiber paper having necessary width and length is cut out from a roll; however, finally, the flat plate-like functional catalyst-supporting glass fiber paper (3) to be packed in the casing (4) may be made to have the same size as that of the corrugated plate-like functional catalyst-supporting glass fiber paper (2) as seen from the plane.

In the applying step of a functional catalyst-containing slurry in the method for manufacturing the processing apparatus (10) equipped with a catalyst-supporting honeycomb structure according to the present invention, the functional catalyst-containing slurry to be applied on the glass fiber paper after removal of the organic binder component is preferably one containing a functional catalyst in which a silica sol is contained. This is because by applying the functional catalyst-containing slurry in which a silica sol is contained on the glass fiber paper after removal of the organic binder, the silica sol carries out a function as an inorganic binder and keeps the shape. It is to be noted that so long as a silica sol content in the functional catalyst is from 10 to 30% by weight, not only a mechanical structure but a catalytic performance can be stably exhibited, and hence, such is preferable. However, it should not be construed that the present invention is limited thereto. The functional catalyst-containing slurry in which a silica sol is contained is one containing the functional catalyst selected from the group consisting of a denitration catalyst, a desulfurization catalyst, a dioxin decomposition catalyst, and an ammonia decomposition catalyst, and the inexpensive catalyst-supporting honeycomb structure (1) using a commercially available glass fiber paper as a base material can be utilized for an exhaust gas cleaning process and manufacture of hydrogen by ammonia decomposition.

Here, for example, as the denitration catalyst, a denitration catalyst described in JP-A-2008-155133 by the present applicant can be used. In this denitration catalyst-containing slurry, a silica sol (Si) that is a binder component and titanium (Ti), vanadium (V), and tungsten (W) that are denitration catalyst metals are contained. In addition, as the ammonia decomposition catalyst, an ammonia decomposition catalyst described in JP-A-2011-78888 can be used. In the ammonia decomposition catalyst, ruthenium (Ru) that is an ammonium decomposition catalyst metal and a promoter are contained, and this ammonia decomposition catalyst can be utilized as the functional catalyst in the present invention when this catalyst contains a silica sol (Si) thereon.

That is, for example, the denitration catalyst-containing slurry is obtained by adding ammonium metavanadate to a slurry of titania fine particles suspended in a silica sol to adsorb titania thereon and further adding ammonium metatungstate or an aqueous solution thereof. Then, this denitration catalyst-containing slurry is applied on the above-described glass fiber paper after removal of the organic binder component and then dried, thereby simultaneously supporting titania, vanadium oxide, and ammonium metatungstate on the glass fiber paper. According to this, supporting of titania, supporting of vanadium, and supporting of tungsten can be conducted at the same time in one step. In consequence, the operation of applying, drying and calcinating may be a one-time operation, and a decrease of the number of steps, an enhancement of productivity, and a reduction of cost can be achieved.

In the step of applying the functional catalyst-containing slurry for denitration or the like on the glass fiber paper after removal of the organic binder component and then drying to support the functional catalyst on the glass fiber paper, as a applying method, it is possible to adopt any applying method, for example, a so-called dipping method, a brush coating method, a spray coating method, a drip coating method, etc.

Now, a reason why the glass fiber paper cannot be molded in a corrugated plate-like form by using a corrugation molding machine (corrugator) resides in the matter that a force of repulsion due to an organic binder contained in the glass fiber paper is so large that even if the glass fiber paper is bent by applying a force, it is returned into an original state. In addition, if a force is excessively applied, the glass fiber paper breaks, and therefore, a large force cannot be applied.

However, it is possible to remove the organic binder with ease by baking the glass fiber paper. In addition, since the glass fiber paper after removal of the organic binder loses a force of repulsion, it can be molded in a corrugated plate-like form. Furthermore, when the functional catalyst-containing slurry is applied on the glass fiber paper after baking, the inorganic binder contained in the slurry, for example, a silica sol, etc., carries out a function as a binder of the glass fiber paper, and by applying the functional catalyst-containing slurry on the glass fiber paper after baking, it is possible to keep the corrugated form. In this way, it has become possible to manufacture the honeycomb structure (1) that is a laminate of a flat plate and a corrugated plate by the functional catalyst-supporting flat plate and the functional catalyst-supporting corrugated plate each utilizing a glass fiber paper without bonding with an adhesive as in the conventional art.

In the shaping step of the functional catalyst slurry-applied glass fiber paper in a corrugated plate-like form in the method for manufacturing the processing apparatus (10) equipped with a catalyst-supporting honeycomb structure according to the present invention, it is preferable that a die composed of a metal panel having parallel recessed grooves having a width of from 5 to 15 mm, a height of from 2 to 10 mm, and a radius of curvature in a groove bottom of from 0.5 to 2 mm is used, and the functional catalyst slurry-applied glass fiber paper placed on the die is pressed down along the recessed grooves of the die by a pressing jig, thereby achieving shaping.

In the pressing jig, a portion that comes into contact with the glass fiber paper is subjected to water repellent finishing, namely TEFLON (registered trademark) finishing. Unless the recessed grooves of the corrugated plate-like die at the lower side of the glass fiber paper to be pressed down have a shape having a radius of curvature of from about 0.5 to 2 mm, pressing-down cannot be achieved, and if the radius of curvature is smaller than this, the glass fiber paper breaks, and hence, such is not preferable.

In the method for manufacturing the processing apparatus (10) equipped with a catalyst-supporting honeycomb structure according to the present invention, it is preferable that the drying steps of the shaped, corrugated plate-like functional catalyst-containing slurry-applied glass fiber paper and the flat plate-like functional catalyst slurry-applied glass fiber paper having not been shaped in a corrugated plate-like form are carried out under a condition at from 250 to 400° C. for from 30 minutes to one hour and thirty minutes, respectively. According to this, it is possible to dry the corrugated plate-like and flat plate-like functional catalyst slurry-applied glass fiber papers without causing a decrease of activity of the functional catalyst such as a denitration catalyst, etc. In addition, the thus dried, corrugated plate-like functional catalyst-containing slurry-applied glass fiber paper can be peeled off from the die with ease.

Here, it is to be noted that in order to surely peel off the shaped, corrugated plate-like functional catalyst-containing slurry-applied glass fiber paper from the die, the drying time and management of the die are important.

First of all, as for the drying temperature and time, it is preferable to dry the catalyst at a temperature of from 250 to 400° C. for a time of from 30 minutes to hour and thirty minutes. For example, if drying is conducted at a temperature of 500° C. or higher for a long time, there is involved such a problem that the activity of the functional catalyst such as a denitration catalyst, etc. decreases.

In the method for manufacturing the processing apparatus (10) equipped with a catalyst-supporting honeycomb structure according to the present invention, the corrugated plate-like functional catalyst-containing slurry-applied glass fiber paper peeled off from the die after drying and the flat plate-like functional catalyst slurry-applied glass fiber paper after drying are made to have substantially the same size as seen from the upper side of the plane.

Thereafter, these are alternately laminated and rendered in a state of a honeycomb structure, and calcination is conducted in this state, thereby forming the functional catalyst-supporting, flat plate-like glass fiber paper (3) and the functional catalyst-supporting, corrugated plate-like glass fiber paper (2).

It is preferable that the calcination step of the corrugated plate-like functional catalyst-containing slurry-applied glass fiber paper and the flat plate-like functional catalyst slurry-applied glass fiber paper as rendered in a state of a honeycomb structure is carried out under a condition at from 400 to 550° C. for from 2 to 4 hours.

Here, the functional catalyst slurry-applied, flat plate-like glass fiber paper and the functional catalyst slurry-applied, corrugated plate-like glass fiber paper are calcinated in a state of being alternately laminated. This is because if only flat plate-like glass fiber papers are stuck, or only corrugated plate-like glass fiber papers are stuck, followed by calcinating the respective stacks, it might be felt that the bulk decreases, and the calcination efficiency is good; however, uniform calcination cannot be achieved. A space made by the flat plate-like glass fiber paper and the corrugated plate-like glass fiber paper is important for the calcination atmosphere, and according to this, uniform calcination can be achieved.

In the packing step of the catalyst-supporting honeycomb structure (1) in the method for manufacturing the processing apparatus (10) equipped with a catalyst-supporting honeycomb structure according to the present invention, it is preferable that the casing (4) is composed of a casing main body (4a) having a lateral cross section of a substantially U-shape and a flat plate-like lid body (4b) that covers an opening of this, or while illustration is omitted, it is composed of a casing main body having a lateral cross section of a substantially L-shape and a lid body to be opposed to and fitted into this and having a lateral cross section of a substantially inverted L-shape.

That is, the functional catalyst-supporting, flat plate-like glass fiber paper (3) after calcination and the functional catalyst-supporting, corrugated plate-like glass fiber paper (2) after calcination are alternately laminated without being bonded to each other, to form the catalyst-supporting honeycomb structure (1), and this catalyst-supporting honeycomb structure (1) is packed in the casing main body (4a) having a lateral cross section of a substantially U-shape, which is made of, for example, stainless steel. Thereafter, the stainless steel-made, flat plate-like lid body (4b) is fitted and covered so as to cover the opening of the casing main body (4a), followed by welding.

Alternatively, the functional catalyst-supporting, flat plate-like glass fiber paper (3) after calcination and the functional catalyst-supporting, corrugated plate-like glass fiber paper (2) after calcination are alternately laminated without being bonded to each other, to form the catalyst-supporting honeycomb structure (1), and this catalyst-supporting honeycomb structure (1) is packed in a casing main body having a lateral cross section of a substantially L-shape, which is made of, for example, stainless steel. Thereafter, a stainless steel-made lid body having a lateral cross section of a substantially inverted L-shape is opposed to and fitted into the casing main body, followed by welding.

It is to be noted that in place of welding, it is also possible to fit one end portions of the casing main body (4a) and of the lid body (4b) to each other by, for example, mutually connecting them in a loose-pin hinge structure and inserting or removing a pin put into the center of the loose-pin hinge structure, thereby fitting the casing main body (4a) and the lid body (4b) to each other. By fixing the casing main body (4a) and the lid body (4b) by utilizing a loose-pin hinge, even if a solid content in the gas to be processed clogs in cells of the catalyst-supporting honeycomb structure (1), the regeneration process can be achieved more easily and more rapidly, and hence, such is preferable.

In the packing step of the catalyst-supporting honeycomb structure (1) in the method for manufacturing the processing apparatus (10) equipped with a catalyst-supporting honeycomb structure according to the present invention, it is preferable that the inorganic fiber blanket (5) is laid on the inner surface of the casing (4) before packing of the catalyst-supporting honeycomb structure (1).

By laying the inorganic fiber blanket (5) on the inner surface of the casing (4), a vibration countermeasure can be taken by a frictional force by the catalyst-supporting honeycomb structure (1) and the inorganic fiber blanket (5).

Here, in the step of laying the inorganic fiber blanket (5) on the inner surface of the casing (4) and alternately laminating the functional catalyst-supporting, flat plate-like glass fiber paper (3) and the functional catalyst-supporting, corrugated plate-like glass fiber paper (2) without being bonded to each other, it is preferable that the functional catalyst-supporting, flat plate-like glass fiber paper (3) is packed on the inorganic fiber blanket (5) in the bottom of the casing (4), namely the lowermost stage. Then, the functional catalyst-supporting, corrugated plate-like glass fiber paper (2) and the functional catalyst-supporting, flat plate-like glass fiber paper (3) are successively alternately laminated. Then, it is preferable that the functional catalyst-supporting, flat plate-like glass fiber paper (3) is packed on the uppermost stage. That is, the number of the flat plate-like glass fiber papers (3) packed in the casing (4) is greater than the number of the corrugated plate-like glass fiber papers (2) by 1.

It is to be noted that it is also preferable that on inner surfaces of both left and right sides of the casing (4), the inorganic fiber blanket (5) is allowed to intervene between the inner surface of the casing (4) and the catalyst-supporting honeycomb structure (1).

In this way, a vibration countermeasure can be taken by a frictional force by the catalyst-supporting honeycomb structure (1) and the inorganic fiber blanket (5) on the inner surface of the casing (4).

EXAMPLES

Examples of the present invention are hereunder described, but it should not be construed that the present invention is limited thereto.

Example 1

A denitration catalyst-supporting honeycomb type processing apparatus was manufactured by the method according to the present invention in the following manner.

First of all, in the method according to the present invention, in a step of baking a commercially available glass fiber paper to remove an organic binder component contained in the glass fiber paper by burning, as the commercially available glass fiber paper, a glass fiber paper containing an acrylic resin organic binder was used. The glass fiber paper was wound in a roll-like form, and a glass fiber paper having a length of 950 mm was cut out from the roll.

Meanwhile, in order to obtain the flat plate-like, denitration catalyst-supporting glass fiber paper (3) having not been shaped in a corrugated plate-like form, the same commercially available glass fiber paper was cut out from the roll; however, a glass fiber paper having a length of 950 mm was cut out from the roll so as to finally have the same size as that of the corrugated plate-like denitration catalyst-supporting glass fiber paper (2) to be packed in the square cylindrical casing (4) as seen from the upper side of the plane.

It is to be noted that finally, the denitration catalyst-supporting, flat plate-like glass fiber papers (3) and the denitration catalyst-supporting, corrugated plate-like glass fiber papers (2) each constituting the denitration catalyst-supporting honeycomb structure (1) were cut out in the number of used sheets of 27 and 26, respectively from the commercially available glass fiber paper roll.

These commercially available glass fiber papers were baked at 400° C. for one hour, thereby removing the organic binder components contained in the glass fibers by burning.

Subsequently, in a step of applying a denitration catalyst-containing slurry on the glass fiber paper after removal of the organic binder component, a denitration catalyst-containing slurry having the following components was used.

That is, to a slurry of titania fine particles suspended in a silica sol (solid content ratio: 45% by weight, ratio of silica sol to titania: 20/80), an ammonium metavanadate powder was added in an amount of 10 g per kg of the slurry, and the whole was stirred for one hour to adsorb ammonium metavanadate on titania.

This denitration catalyst-containing slurry was applied on a surface of each of the glass fiber papers after removal of the above-described organic binder component in a applying amount of 1,200 g/m$^2$ on a corrugated plate-like shaping die.

When the above-described denitration catalyst-containing slurry was applied on the organic binder component-removed glass fiber paper after baking, an inorganic binder composed of the silica sol contained in the slurry carried out a function as a binder of the glass fiber paper. Thus, by applying the denitration catalyst-containing slurry on the glass fiber paper after baking, it became possible to keep the corrugated shape.

That is, in a shaping step of the denitration catalyst-containing slurry-applied glass fiber paper in a corrugated plate-like form, a die composed of a stainless steel-made corrugated plate-like panel having parallel recessed grooves having a width of 10.4 mm, a height of 7.4 mm, and a radius of curvature in a groove bottom of 1.6 mm was used, the denitration catalyst-containing slurry-applied glass fiber paper placed on the die was pressed down along the recessed grooves of the die by a pressing jig, thereby achieving shaping. Though it is preferable to use, as the pressing jig, a jig in which a portion that comes into contact with the glass fiber paper is subjected to water repellent finishing, namely TEFLON (registered trademark) finishing, in this Example, a TEFLON (registered trademark) plate having a side edge portion coming into the recessed grooves of the die composed of a corrugated plate-like panel was used.

It is to be noted that a applying work of the denitration catalyst-containing slurry on the surface of the flat plate-like organic binder-removed glass fiber paper to be not shaped can be conducted on, for example, a stainless steel-made flat plate-like panel.

Subsequently, a drying step of the shaped, corrugated plate-like, denitration catalyst-containing slurry-applied glass fiber paper and a drying step of the flat plate-like, denitration catalyst slurry-applied glass fiber paper having not been shaped in a corrugated plate-like form were carried out at a temperature of 300° C. for one hour, respectively.

The corrugated plate-like, denitration catalyst-containing slurry-applied glass fiber paper after drying was peeled off from the die composed of a corrugated plate-like panel.

The corrugated plate-like, denitration catalyst-containing slurry-applied glass fiber paper peeled off from the die after drying and the flat plate-like, denitration catalyst slurry-applied glass fiber paper after drying are of a rectangle of the same size as seen from the upper side of the plane and have a width of 142 mm and a length of 950 mm, respectively.

27 sheets of the flat plate-like, denitration catalyst slurry-applied glass fiber papers after drying and 26 sheets of the corrugated plate-like, denitration catalyst-containing slurry-applied glass fiber papers after drying were alternately laminated and rendered in a state of a honeycomb structure. Calcination was conducted in this state at 400° C. for one hour, thereby forming the denitration catalyst-supporting, flat plate-like glass fiber paper (3) and the denitration catalyst-supporting, corrugated plate-like glass fiber paper (2).

At that time, a space made by the flat plate-like, denitration catalyst slurry-applied glass fiber paper and the corrugated plate-like, denitration catalyst slurry-applied glass fiber paper is important for the calcination atmosphere, and according to this, uniform calcination could be achieved.

Subsequently, the square cylindrical casing (4) composed of the stainless steel-made casing main body (4a) having a lateral cross section of a substantially U-shape and the flat plate-like, stainless steel-made lid body (4b) that covers an opening of this was provided; the ceramic fiber-made blanket (5) was laid in the casing main body (4a); and thereafter, the catalyst-supporting honeycomb structure (1) in which the denitration catalyst-supporting, flat plate-like glass fiber paper (3) after calcination and the denitration catalyst-supporting, corrugated plate-like glass fiber paper (2) after calcination were alternately laminated without being bonded to each other was packed, thereby manufacturing the denitration catalyst-supporting honeycomb type processing apparatus (10) according to the present invention.

According to the processing apparatus (10) equipped with a catalyst-supporting honeycomb structure of Example 1 of the present invention, the catalyst-supporting honeycomb structure (1) could be formed by using a commercially available, inexpensive glass fiber paper as a base material. Moreover, since it is merely required that a functional catalyst-containing slurry is applied on the glass fiber paper after removal of the organic binder component and then dried and calcinated, the manufacturing cost is low without requiring large-scale equipment such as a dipping tank, a drying device, etc. as conventionally used for a so-called adhesive type honeycomb structure.

In addition, for example, in an exhaust gas cleaning process or the like, even if a solid content in a gas to be processed clogs in cells of the catalyst-supporting honeycomb structure (1) with a lapse of operating time, since the functional catalyst-supporting, corrugated plate-like glass fiber paper (2) and the functional catalyst-supporting, flat plate-like glass fiber paper (3) are alternately laminated without being bonded to each other, to form the catalyst-supporting honeycomb structure (1), and this catalyst-supporting honeycomb structure (1) is packed in the casing (4), these can be discharged separately from the casing (4), the discharged functional catalyst-supporting, corrugated plate-like glass fiber paper (2) and the functional catalyst-supporting, flat plate-like glass fiber paper (3) as discharged can be easily regenerated by means of cleaning or the like. Therefore, a lowering of a contact area with the gas to be processed or an increase of a pressure loss can be surely prevented from occurring.

Example 2

Though the denitration catalyst-supporting honeycomb type processing apparatus (10) is manufactured by the method according to the present invention in the same manner as that in the case of the above-described Example 1, a point which is different from that in the case of the above-described Example 1 resides in components of the denitration catalyst-containing slurry.

That is, to a slurry of titania fine particles suspended in a silica sol (solid content ratio: 45% by weight, ratio of silica to titania: 20/80), an ammonium metavanadate powder was added in an amount of 10 g per kg of the slurry, and the whole was stirred for one hour to adsorb ammonium metavanadate on titania.

Subsequently, to the above-described slurry, an ammonium metatungstate aqueous solution (3.88 moles/L) was further added in an amount of 28 mL per kg of the slurry, and the whole was stirred for one hour.

The denitration catalyst-supporting honeycomb type processing apparatus (10) was manufactured in the same manner as that in the case of the above-described Example 1, except for using this denitration catalyst-containing slurry.

Similar to the case of the above-described Example 1, according to the processing apparatus (10) equipped with a catalyst-supporting honeycomb structure of Example 2 of the present invention, the catalyst-supporting honeycomb structure (1) could be formed by using a commercially available, inexpensive glass fiber paper as a base material. Moreover, since it is merely required that a functional catalyst-containing slurry is applied on the glass fiber paper after removal of the organic binder component and then dried and calcinated, the manufacturing cost is low without requiring large-scale equipment such as a dipping tank, a drying device, etc. as conventionally used for a so-called adhesive type honeycomb structure.

In addition, for example, in an exhaust gas cleaning process or the like, even if a solid content in a gas to be processed clogs in cells of the catalyst-supporting honeycomb structure (1) with a lapse of operating time, since the functional catalyst-supporting, corrugated plate-like glass fiber paper (2) and the functional catalyst-supporting, flat plate-like glass fiber paper (3) are alternately laminated without being bonded to each other, to form the catalyst-supporting honeycomb structure (1), and this catalyst-supporting honeycomb structure (1) is packed in the casing (4), these can be discharged separately from the casing (4), the discharged functional catalyst-supporting, corrugated plate-like glass fiber paper (2) and the functional catalyst-supporting, flat plate-like glass fiber paper (3) as discharged can be easily regenerated by means of cleaning or the like. Therefore, a lowering of a contact area with the gas to be processed or an increase of a pressure loss can be surely prevented from occurring.

The invention claimed is:

1. A method for manufacturing a processing apparatus equipped with a catalyst-supporting honeycomb structure, which is characterized by consisting of a step of baking a glass fiber paper to remove an organic binder component contained in the glass fiber paper by burning; a step of applying a functional catalyst-containing slurry on the glass fiber paper after removal of the organic binder component; a step of shaping the functional catalyst-containing slurry-applied glass fiber paper by a crimping die and a pressing jig to form a shaped, corrugated plate-like functional catalyst-containing slurry-applied glass fiber paper; a step of drying the shaped, corrugated plate-like functional catalyst-containing slurry-applied glass fiber paper and peeling it off from the die; meanwhile, a step of drying a flat plate-like functional catalyst slurry-applied glass fiber paper having not been shaped in a corrugated plate-like form; a step of calcinating the shaped, corrugated plate-like functional catalyst-containing slurry-applied glass fiber paper and the flat plate-like functional catalyst slurry-applied glass fiber paper to form a functional catalyst-supporting, flat plate-like glass fiber paper and a functional catalyst-supporting, corrugated plate-like glass fiber paper; and a step of alternately laminating the functional catalyst-supporting, flat plate-like glass fiber paper after calcination and the functional catalyst-supporting, corrugated plate-like glass fiber paper after calcination without being bonded to each other, to form a catalyst-supporting honeycomb structure and a step of packing this catalyst-supporting honeycomb structure in a casing.

2. The method for manufacturing a processing apparatus equipped with a catalyst-supporting honeycomb structure according to claim 1, which is characterized in that the step of baking to remove the organic binder component of the glass fiber paper is carried out under a baking condition of from 350 to 450° C. for from 30 minutes to one hour and thirty minutes.

3. The method for manufacturing a processing apparatus equipped with a catalyst-supporting honeycomb structure according to claim 1, which is characterized in that in the step of applying the functional catalyst-containing slurry, a functional catalyst-containing slurry in which a silica sol is contained is used.

4. The method for manufacturing a processing apparatus equipped with a catalyst-supporting honeycomb structure according to claim 1, which is characterized in that in the step of shaping the functional catalyst slurry-applied glass fiber paper into the shaped, corrugated plate-like functional catalyst-containing slurry-applied glass fiber paper, a die composed of a metal panel having parallel recessed grooves having a width of from 5 to 15 mm, a height of from 2 to 10 mm, and a radius of curvature in a groove bottom of from 0.5 to 2 mm is used, and the functional catalyst slurry-applied glass fiber paper placed on the die is pressed down along the recessed grooves of the die by the pressing jig, thereby achieving shaping.

5. The method for manufacturing a processing apparatus equipped with a catalyst-supporting honeycomb structure according to claim 1, which is characterized in that the steps of drying the shaped, corrugated plate-like functional catalyst-containing slurry-applied glass fiber paper and the flat plate-like functional catalyst slurry-applied glass fiber paper having not been shaped in a corrugated plate-like form are carried out under a condition at from 250 to 400° C. for from 30 minutes to one hour and thirty minutes, respectively.

6. The method for manufacturing a processing apparatus equipped with a catalyst-supporting honeycomb structure according to claim 1, which is characterized in that the step of calcinating the corrugated plate-like functional catalyst-containing slurry-applied glass fiber paper and the flat plate-like functional catalyst slurry-applied glass fiber paper as formed in a honeycomb structure is carried out under a condition at from 400 to 550° C. for 2 to 4 hours.

7. The method for manufacturing a processing apparatus equipped with a catalyst-supporting honeycomb structure according to claim 1, which is characterized in that in the step of packing the catalyst-supporting honeycomb structure, an inorganic fiber blanket is laid on an inner surface of the casing before packing of the catalyst-supporting honeycomb structure.

8. The method for manufacturing a processing apparatus equipped with a catalyst-supporting honeycomb structure according to claim 2, which is characterized in that in the step of applying the functional catalyst-containing slurry, a functional catalyst-containing slurry in which a silica sol is contained is used.

9. The method for manufacturing a processing apparatus equipped with a catalyst-supporting honeycomb structure according to claim 2, which is characterized in that in the step of shaping the functional catalyst slurry-applied glass fiber paper into the shaped, corrugated plate-like functional catalyst-containing slurry-applied glass fiber paper, a die composed of a metal panel having parallel recessed grooves having a width of from 5 to 15 mm, a height of from 2 to 10 mm, and a radius of curvature in a groove bottom of from 0.5 to 2 mm is used, and the functional catalyst slurry-applied glass fiber paper placed on the die is pressed down along the recessed grooves of the die by the pressing jig, thereby achieving shaping.

10. The method for manufacturing a processing apparatus equipped with a catalyst-supporting honeycomb structure according to claim 3, which is characterized in that in the step of shaping the functional catalyst slurry-applied glass fiber paper into the shaped, corrugated plate-like functional catalyst-containing slurry-applied glass fiber paper, a die composed of a metal panel having parallel recessed grooves having a width of from 5 to 15 mm, a height of from 2 to 10 mm, and a radius of curvature in a groove bottom of from 0.5 to 2 mm is used, and the functional catalyst slurry-applied glass fiber paper placed on the die is pressed down along the recessed grooves of the die by the pressing jig, thereby achieving shaping.

11. The method for manufacturing a processing apparatus equipped with a catalyst-supporting honeycomb structure according to claim 2, which is characterized in that the steps of drying the shaped, corrugated plate-like functional catalyst-containing slurry-applied glass fiber paper and the flat plate-like functional catalyst slurry-applied glass fiber paper having not been shaped in a corrugated plate-like form are carried out under a condition at from 250 to 400° C. for from 30 minutes to one hour and thirty minutes, respectively.

12. The method for manufacturing a processing apparatus equipped with a catalyst-supporting honeycomb structure according to claim 3, which is characterized in that the steps of drying the shaped, corrugated plate-like functional catalyst-containing slurry-applied glass fiber paper and the flat plate-like functional catalyst slurry-applied glass fiber paper having not been shaped in a corrugated plate-like form are carried out under a condition at from 250 to 400° C. for from 30 minutes to one hour and thirty minutes, respectively.

13. The method for manufacturing a processing apparatus equipped with a catalyst-supporting honeycomb structure according to claim 4, which is characterized in that the steps of drying the shaped, corrugated plate-like functional catalyst-containing slurry-applied glass fiber paper and the flat plate-like functional catalyst slurry-applied glass fiber paper having not been shaped in a corrugated plate-like form are carried out under a condition at from 250 to 400° C. for from 30 minutes to one hour and thirty minutes, respectively.

14. The method for manufacturing a processing apparatus equipped with a catalyst-supporting honeycomb structure according to claim 2, which is characterized in that the step of calcinating the corrugated plate-like functional catalyst-containing slurry-applied glass fiber paper and the flat plate-like functional catalyst slurry-applied glass fiber paper as formed in a honeycomb structure is carried out under a condition at from 400 to 550° C. for 2 to 4 hours.

15. The method for manufacturing a processing apparatus equipped with a catalyst-supporting honeycomb structure according to claim 3, which is characterized in that the step of calcinating the corrugated plate-like functional catalyst-containing slurry-applied glass fiber paper and the flat plate-like functional catalyst slurry-applied glass fiber paper as formed in a honeycomb structure is carried out under a condition at from 400 to 550° C. for 2 to 4 hours.

16. The method for manufacturing a processing apparatus equipped with a catalyst-supporting honeycomb structure according to claim 4, which is characterized in that the step of calcinating the corrugated plate-like functional catalyst-containing slurry-applied glass fiber paper and the flat plate-like functional catalyst slurry-applied glass fiber paper as formed in a honeycomb structure is carried out under a condition at from 400 to 550° C. for 2 to 4 hours.

17. The method for manufacturing a processing apparatus equipped with a catalyst-supporting honeycomb structure according to claim 5, which is characterized in that the step of calcinating the corrugated plate-like functional catalyst-containing slurry-applied glass fiber paper and the flat plate-like functional catalyst slurry-applied glass fiber paper as formed in a honeycomb structure is carried out under a condition at from 400 to 550° C. for 2 to 4 hours.

18. The method for manufacturing a processing apparatus equipped with a catalyst-supporting honeycomb structure according to claim 2, which is characterized in that in the step of packing the catalyst-supporting honeycomb structure, an inorganic fiber blanket is laid on an inner surface of the casing before packing of the catalyst-supporting honeycomb structure.

19. The method for manufacturing a processing apparatus equipped with a catalyst-supporting honeycomb structure according to claim 3, which is characterized in that in the step of packing the catalyst-supporting honeycomb structure, an inorganic fiber blanket is laid on an inner surface of the casing before packing of the catalyst-supporting honeycomb structure.

20. The method for manufacturing a processing apparatus equipped with a catalyst-supporting honeycomb structure according to claim 4, which is characterized in that in the step of packing the catalyst-supporting honeycomb structure, an inorganic fiber blanket is laid on an inner surface of the casing before packing of the catalyst-supporting honeycomb structure.

\* \* \* \* \*